United States Patent Office 3,801,672
Patented Apr. 2, 1974

3,801,672
OXIDATIVE DEHYDROGENATION PROCESS
AND CATALYSTS
Laimonis Bajars, Princeton, N.J., assignor to Petro-Tex
Chemical Corporation, Houston, Tex.
No Drawing. Continuation-in-part of abandoned application Ser. No. 72,195, Sept. 14, 1970. This application Dec. 20, 1972, Ser. No. 316,958
Int. Cl. C07c 5/18
U.S. Cl. 260—683.3                    19 Claims

ABSTRACT OF THE DISCLOSURE

Hydrocarbons can be dehydrogenated by oxidative dehydrogenation over unique catalyst that contains at least Mg, Cr, and O preferably as the oxides to obtain high yields of the desired products, e.g., n-butane butenes and butadienes. The addition of S, W or a Group IV element further enhances the yields. A principal advantage of the present process over conventional dehydrogenation is the successful use of the alkane in a continuous process to give results as good or better than those presently obtained in cyclic non-oxidative dehydrogenation processes.

This application is a continuation-in-part of application Ser. No. 72,195 filed Sept. 14, 1970, now abandoned.

The present invention relates to oxidative dehydrogenation of organic compounds over unique catalyst containing magnesium, chromium and oxygen.

Although determinations regarding the mechanism of reaction are difficult, the process of oxidative dehydrogenation is considered to have as the predominant mechanism the reaction of oxygen with the hydrogen released from the organic compound being dehydrogenated. Such reactions are well known in the art and are described in regard to various catalysts and reactants. For example, U.S. Pats. 2,719,171; 3,207,805; 3,270,080; 3,284,536; 3,303,235; 3,303,236; 3,303,238; 3,308,182; 3,320,329; 3,324,195; 3,334,152; 3,336,408; 3,437,703; 3,446,869; 3,342,890; 3,398,100; 3,450,787; 3,456,030; 3,420,911; 3,420,912; 3,428,703 and 3,490,299 discloses a variety of such processes and catalysts, although not exhaustively.

The present invention differs in fact from many of the prior art oxidative dehydrogenation processes in that it is particularly useful for the treating of saturated organic compounds to produce olefins, diolefins and acetylenic products. The prior art of oxidative dehydrogenation has not demonstrated any real degree of success in the oxidative dehydrogenation of saturated organic compounds such as the alkanes. Presently the processes that are most successful in dehydrogenation of saturated organic compounds are non-oxidative dehydrogenations which of necessity are operated in a cyclic fashion, i.e., dehydrogenation, decoking of catalyst, dehydrogenation, etc.

It is an object of the present invention to provide a process and catalyst for the oxidative dehydrogenation of organic compounds. It is another purpose of the present invention to provide a continuous process for the dehydrogenation (oxidative) of saturated organic compounds, to produce yields of the desired dehydrogenated compounds comparable and/or superior to those obtained with the present cyclic dehydrogenation processes. It is a further object of this invention to provide a process by the use of the designated catalysts of the invention which will operate under moderate conditions of temperature and pressure.

There are distinct disadvantages in operating dehydrogenation processes at excessively high temperatures, and at certain temperatures the process becomes uneconomical. For one thing, the mechanical stresses in the reactor are more pronounced at higher temperatures and consequently it is necessary to compensate for these stresses in the construction of the reactor. At high temperatures there is a problem of embrittlement of the reactor materials. Another advantage resulting from operating at lower temperatures is that the problem of quenching of the reaction gases is alleviated when operating at these lower temperatures and quenching can either be reduced or in some instances entirely eliminated. By avoiding quenching or by reducing the amount of quench water, there is less steam generated due to quenching and correspondingly there is less steam to be condensed downstream. Still another advantage of operating at a lower temperature is that thermal cracking reactions are less pronounced. These and other objects and advantages will become obvious from the following description of the invention.

Briefly stated the present invention is a process and catalyst for the oxidative dehydrogenation of organic compounds, containing at least one

grouping and having a boiling point below about 350° C. comprising contacting said organic compound with oxygen at a temperature of at least 250° C. in the vapor phase in the presence of a catalyst containing magnesium, chromium and oxygen.

The process of this invention is particularly suited to the oxidative dehydrogenation of saturated organic compounds or compounds which contain moieties that correspond to saturated organic compounds, e.g., ethyl benzene. Such compounds normally will contain from 2 to 20 carbon atoms, at least one

grouping, and a boiling point below about 350° C. and may contain other elements, in addition to carbon and hydrogen, such as oxygen, halogens, nitrogen nad sulfur. Preferred compounds will have 2 to 12 carbon atoms, and more preferably 3 to 8 carbon atoms.

Among the types of organic compounds which may be dehydrogenated by means of the process of this invention are nitriles, amines, alkyl halides, ethers, esters, aldehydes, ketones, alcohols, acids alkyl aromatic compounds, alkyl heterocyclic compounds, cycloalkanes, alkanes, olefins and the like. Illustration of dehydrogenations include propionitrile to acrylonitrile; propionaldehyde to acrolein; ethyl chloride to vinyl chloride; methyl isobutyrate to methyl methacrylate; 2,3 dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1,3; cyclopentane to cyclopentene and cyclopentadiene-1,3; n-octane to ethyl benzene and ortho-xylene; monomethyl-heptanes to xylenes; ethyl acetate to vinyl acetate, 2,4,4-trimethylpentane to xylenes; n-butene to butadiene-1,3; 2-methyl butene-1 to isoprene and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3-dichlorobutane, 1,4-dichlorobutane, the chlorofluoroethanes, methyl pentane, methylethyl ketone, diethyl ketone, n-butyl alcohol, methyl propionate and the like.

Suitable dehydrogenation reactions are the following: Acyclic compounds having 4 to 5 non-quarternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acyclic compounds having 6 to 16 carbon atoms and no quarternary carbon atoms to aromatic compounds such as n-hexane to benzene; cycloparaffins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be oxidatively dehydrogenated according to this invention are hydrocarbons having 3 to 6 carbon atoms more preferably acyclic nonquarternary hydrocarbons having 4 to 5 contiguous carbon atoms and ethyl benzene with the preferred products being ethylene, propylene, butenes, butadiene-1,3, pentenes, isoprene and styrene. Particularly preferred feeds are n-butane, isobutane and the methyl butanes.

The catalysts of the present invention contain magnesium, chromium and oxygen. A preferred catalyst comprises at least one oxide of Mg or Cr. The catalysts of the invention can be prepared in a number of ways and represent single compounds and mixtures of compounds. Starting compounds may be such as the nitrates, hydroxides, hydrates, oxalates, carbonates, acetates, formates, halides, oxides and the like. The catalysts can be prepared by precipitation, coprecipitation, preparation in solution or slurry and evaporation of the solution or slurry, and other conventional means of obtaining intimate contacting of the requisite components. For example, magnesium chromate can be prepared by dissolving $MgCO_3$ in $H_2CrO_4$ and evaporation of the solution to dryness. Another method of preparing $MgCrO_4$ is to dissolve

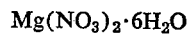

$Mg(NO_3)_2 \cdot 6H_2O$ and $(NH_4)_2CrO_4$ in water, evaporation to dryness and calcination of the resulting mixture. Catalysts can also be prepared by depositing one component onto the other, e.g. $CrO_3$ can be deposited on MgO pellets. Although the catalyst components may be calcined such a procedure is not necessary and can be detrimental to the activity of the catalyst if high temperatures are employed. Normally, calcinations will be carried out at less than 700° C. preferably 600° C. or less.

In addition to Mg, Cr and O preferred catalysts according to this invention will contain S, W, a group IV element or mixtures thereof, particularly at least one of the components selected from the group consisting of S, W, Si, Ti, Sn, Ge, Zn and mixtures thereof. The amount of additive added to the catalyst can vary over a wide range. Preferably the additive will be present in minor amounts although amounts of up to 70 percent by weight based on the total weight of the catalyst could be employed. Sulfur has been found to be a particularly useful additive being added to catalyst during its preparation as a salt, e.g., $MgSO_4$ or as the acid $H_2SO_4$. Similarly the sulfur can be added after the catalyst is formed for example, by passing $H_2SO_4$ or $SO_2$ over the catalyst prior to or during the oxidative dehydrogenation. The quantity of S added to the dehydrogenation feed will vary, however, generally about .001 to 1 atom of S per/mole of organic compound to be dehydrogenated will be added. It is believed that the smaller quantities of sulfur that are added in the vapor phase are possible because of the relatively even distribution of the sulfur on the surface of the catalyst. The additives can be placed in or with the catalyst in the same manner as that described for the Mg, Cr and O, i.e. precipitation, coprecipitation, solution, slurrying, and the like. The effect of the additive on the catalyst is to improve the dehydrogenation of saturated compounds to the desired products.

Particularly preferred catalyst are those containing Mg, Cr, O and S, W, or Ge.

Carriers or supports for the catalyst may be employed such as alumina, pumice, silica and so forth. Diluents and binders may also be used. Unless stated otherwise, the compositions referred to in this application are the main active constituents of the dehydrogenation process during dehydrogenation and any ratios and percentages refer to the surface of the catalst in contact with the gaseous phase during dehydrogenation.

The oxidative dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, solid oxidants, and so forth. Oxygen may also be added in increments to the dehydrogenation zone.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor) in the dehydrogenation zone in an amount from about 0.2 to 1.5, preferably 0.3 to 1.2 moles per mole of $H_2$ being liberated from the organic compound. Ordinarily the moles of oxygen supplied will be in the range of from .2 to 2.0 moles per mole of organic compound to be dehydrogenated and for most dehydrogenations this will be within the range of .25 to 1.5 moles of oxygen per mole of organic compound.

Preferably, the reaction mixture contains a quantity of steam or diluent such as nitrogen with the range generally being between about 2 and 40 moles of steam per mole of organic compound to be dehydrogenated. Preferably, steam will be present in an amount from about 3 to 35 moles per mole of organic compound to be dehydrogenated and excellent results have been obtained within the range of about 5 to about 30 moles of steam per mole of organic compound to be dehydrogenated. The functions of the steam are several fold, and the steam may not merely act as a diluent. Diluents generally may be used in the same quantities as specified for the steam. These gases serve also to reduce the partial pressure of the organic compound.

The temperature for the dehydrogenation reaction generally will be at least about 250° C. such as greater than about 300° C. and the maximum temperature in the reactor may be about 700° C. or 800° C. or perhaps higher such as 900° C. under certain circumstances. However, excellent results are obtained within the range of or about 350° C. to 700° C. such as from or about 400° C. to or about 675° C. The temperatures are measured at the maximum temperature in the dehydrogenation zone.

The gaseous reactants may be conducted through the reaction chamber at a fairly wide range of flow rates. The optimum flow rate will be dependent upon such variables as the temperature of reaction, pressure, particle size, and so forth. Desirable flow rates may be established by one skilled in the art. Generally the flow rates will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The process of this invention utilizes either a fixed bed or moving bed, such as a fluidized catalyst reactor. Reactors which have been used for the dehydrogenation of hydrocarbons by non-oxidative dehydrogenation are satisfactory such as the reactors for the dehydrogenation of n-butene to butadiene-1,3. Although means to remove heat from the reactor may be employed, such as coils, the invention is particularly useful with essentially adiabatic reactors where heat removal is a problem.

The following examples are only illustrative of the invention and are not intended to limit the invention. All percentages of catalyst preparations are weight percent unless specified otherwise. All conversions, selectivities and yields are expressed in mole percent of the designated feed.

EXAMPLE 1

A series of runs were made at a various ratio of Cr and Mg. The catalysts were prepared by depositing a slurry of $MgCO_3$ (40% MgO) and $CrO_3$ on 3–6 mesh alumina (AMC Carborundum) and evaporating to dryness. The supported catalyst was placed in a reactor and n-butane, oxygen, steam and $H_2SO_4$ fed at an LHSV of n-butane of 0.25. The mole ratio of n-butane/$O_2$/Steam/$S_2$* at 550–575° C. The mole ratio of $CrO_3$/MgO is given for each run. The results are reported as conversion, selectivity and yield, i.e. C/S/Y in mole percent.

The selectivity and yield are for a combination of butenes and butadiene.

| Run | $CrO_3$/MgO, mole ratio | C/S/Y, mole percent |
|---|---|---|
| 1 | 3:1 | 23/32/7 |
| 2 | 1.5:1 | 29/46/13 |
| 3 | 1:1 | 28/54/15 |
| 4 | 0.6:1 | 28/48/13 |
| 5 | 0.5:1 | 28/30/8 |

EXAMPLE 2

A catalyst was prepared by evaporating 100 cc. of Mg-chromate solution, containing 20.5 g. $CrO_3$ and 5.7 g. MgO, depositing the solution on 50 cc. 3–6 mesh AMC and evaporating to dryness. Isobutane at an LHSV of 0.25 and mole ratio of iso-B/$O_2$/Steam of 1/1/20 at 525–550° C. gave C/S/Y of 20/35/7 isobutene. The addition of 0.02 at S/g. mole of isobutane gave C/S/Y isobutane of 20/40/8.

EXAMPLE 3

Using a catalyst prepared according to Example 2, but a feed of n-butane with a mole ratio of n-butane/$O_2$/steam/S of 1/1/20/0.02 at 0.25 LHSV and 550° C. the C/S/Y was 30/50/15 mixed butene and butadiene.

EXAMPLE 4

A catalyst was prepared by depositing 25 g. of $CrO_3$ on 75 g. MgO pellets. Normal butane was fed at 0.5 LHSV and a mole ratio of n-butane/$O_2$/Steam/S (added

---

*Reference herein to moles of S is understood to signify the atomic ratio since S does not exist as a molecule, e.g., in this example the ratio is 1 gram mole n-butane/1 gram mole $O_2$/20 gram moles steam/0.02 gram atom sulfur.

--- as $H_2SO_4$) of 1/1/20/0.02. The average C/S/Y for 3 hours at 575–600° C. was 28/16 butene and butadiene. The total amount of sulfur fed in 3 hours was 0.433 g. The catalyst contained 0.1477 g. of S after the run and 0.1489 g. of S was recovered from the reaction effluent.

EXAMPLE 5

A catalyst was prepared as in Example 4 and the same conditions of operation observed except that the $H_2SO_4$ was discontinued after 1 hour. The table shows the results of the run.

| Time | S added (g./hr.) | S recovered from reaction effluent (g./hr.) | C/S/Y butene plus butadiene (mole percent) |
|---|---|---|---|
| 1st hour | 0.21 | 0.0475 | 29/54/16 |
| 2d hour | None | 0.547 | 27/46/13 |
| 3d hour | None | 0.0147 | 27/44/12 |
| 4th hour | None | 0.0056 | 27/43/12 |

NOTE.—0.043 g. of S was found on the catalyst after the 4th hour.

EXAMPLE 6

The catalyst from Example 5 was crushed in a ball mill to a fine powder, mixed with water, deposited on 3–6 mesh alumina and dried. Normal butane was fed at 0.5 LHSV in a mole ratio of n-butane/$O_2$/Steam of 1/1/20 at 550° C. and gave C/S/Y of 25/45/11 (7% butene+4% butadiene). Addition of 0.02 g. at S/g. mole n-butane g. (as $H_3SO_4$) gas C/S/Y of 27/60/16 (9% butene+7% butadiene).

EXAMPLE 7

A solution of equimolar amounts of $Mg(NO_3)_2 \cdot 6H_2O$ and $(NH_4)_2CrO_4$ was evaporated to dryness on 3–6 mesh AMC and calcined for 1 hour at 550–600° C. Under these conditions some of the catalyst components converted to $MgCrO_4$. N-butane was fed at LHSV 0.25 and mole ratio of n-butane/$O_2$/Steam/S of 1/1/20/0.02 at 550–525° C. to C/S/Y of butene and butadiene of 24/60/14.

EXAMPLE 8

A solution of $MgCrO_4$ was prepared by dissolving $MgCO_3$ in $H_2CrO_4$. The solution of $MgCrO_4$ was evaporated to dryness on 3–6 mesh AMC. Conditions for the oxidative dehydrogenation on n-butane were the same as in Example 7. C/S/Y was 24/50/12 (butene+butadiene). Using Vycor Raschig rings instead of alumina as the support gave C/S/Y (butene+butadiene) 20/60/12. The ratio of butenes to butadiene was about 3:2.

EXAMPLE 9

A catalyst was prepared by slurrying 100 g. magnesium trisilicate in a solution of 40 g. $CrO_3$ dissolved in distilled water, depositing the slurry on 3–6 mesh alumina·n-butane at 0.5 LHSV, mole ratio of n-butane/$O_2$/Steam of 1/1/20 gave C/S/Y at 575° C. of 23/52/12. With $H_2SO_4$ added to the feed (0.02 g. at S/g. mole n-butane) C/S/Y=30/58/17 (butene+butadiene).

EXAMPLE 10

A catalyst was prepared from 100 g. magnesium zirconium silicate and 40 g. $CrO_3$ dissolved in distilled water. The prepared paste was dried, crushed to 3–5 mesh and used without a carrier. At 0.5 LHSV and n-butane/$O_2$/Steam mole ratio of 1/1/20 at 580° C., the C/S/Y was 24/55/13 (7% butene+6% butadiene). The addition of $H_2SO_4$ to the feed (0.02 g. at S/g. mole n-butane at 570° C. gave C/S/Y of 29/59/17 (9% butene+8% butadiene).

EXAMPLE 11

A catalyst was prepared from 60 g. of magnesium zirconium silicate and 40 g. of CrO₃ deposited on 3-6 mesh alumina from a slurry. N-Butane was fed at LHSV 0.5, mole ratio of n-butane/O₂/Steam of 1/1/20 at 600° C. to give C/S/Y 28/50/14 butene+butadiene. H₂SO₄ added to the feed at 0.01 g. at S/g. mole n-butane improved the C/S/Y to 34/60/20.

EXAMPLE 12

A catalyst was prepared by dissolving 40 g. CrO₃ and 16 g. tungstogermanic acid [H₄(GeW₁₂O₄₀] in distilled water, this solution was slurried with 60 g. of magnesium zirconium silicate and deposited on 3-6 mesh alumina. n-Butane was fed at 0.5 LHSV and mole ratio of n-butane/O₂/Steam of 1/1/20 at 575° C. the C/S/Y was 26/50/13 butene and butadiene. At mole ratio n/butane/O₂/Steam of 1/1/30 at 600° C. C/S/Y was improved to 31/60/19 (7% butene+12% butadiene).

EXAMPLE 13

A catalyst prepared similarly to that of Example 12 was used to oxidatively dehydrogenate n-butane at 0.25 LHSV, n-butane/O₂/steam mole ratio of 1/1/20 at 590° C. to produce C/S/Y of 32/58/18 (butene+butadiene). Addition of H₂SO₄ (0.01 g. at S/g. mole n-butane) gave C/S/Y of 35/60/21.

EXAMPLE 14

A catalyst was prepared to contain 15% Cr. Magnesium titanate was slurried in a solution of $$Cr(NO_3)_2 \cdot 9H_2O$$

deposited on 3-6 alumina, dried and calcined for 1 hour at 550-600° C. to decompose the nitrate to CrO₃. At LHSV 0.25, n-butane/O₂/steam mole ratio of 1/1/20 at 500° C. the C/S/Y of butene+butadiene was 20/50/10. Addition of H₂SO₄ (0.02 g. at S/g. mole of n-butane) gave C/S/Y of 25/60/15.

EXAMPLE 15

Two catalysts were prepared according to Example 14 using 60 g. Mg-titanate, 8 gr. Cr(NO₃)₃·9H₂O and modifier, i.e. silicotungstic acid or tungstogermanic acid. The additions and results are shown in the table below:

TABLE
[LHSV=0.5 mole ratio; n-butane/O₂/steam=1/1/20; reaction temp. 575-625° C.]

| Acid | Grams added | C/S/Y (mole percent) butene+ butadiene |
|---|---|---|
| Silicotungstic | 40 | 28/65/18 |
| Tungstogermanic | 40 | 34/60/20 |

The addition of S in the form of H₂SO₄ in the reactant feed at the rate of 0.01 g. at S/g. mole n-butane produced no improvements in conversion, selectivity of yield.

EXAMPLE 16

A catalyst was prepared by slurrying magnesium stannate in a solution of Cr(NO₃)₃ (15% Cr), depositing on 3-6 mesh AMC alumina and calcining at 600° C. for 1 hour. n-Butane was oxidative dehydrogenated at LHSV 0.25, mole ratio n-butane/O₂/steam/S of 1/1/20/0.02, and 500-525° C. to give C/S/Y 5 butene plus butadiene of 25/55/14.

The invention claimed is:

1. A process for the oxidative dehydrogenaton of saturated hydrocarbons having 2 to 20 carbon atoms and at least one

grouping and having a boiling point below about 350° C. said process comprising contacting a reaction mixture with a catalyst at a temperature of at least 250° C. and less than 900° C. said reaction mixture comprising said hydrocarbons in the vapor phase and oxygen in a molar ratio of greater than 0.1 mole of oxygen per mol of said hydrocarbons, said catalyst consisting essentially of a composition selected from the group consisting of (1) a magnesium compound and a chromium compound, (2) magnesium chromate and, (3) magnesium oxide, chromium oxide and magnesium chromate, wherein said magnesium compound is selected from the group consisting of magnesium nitrate, magnesium hydroxide, magnesium hydrates, magnesium oxalate, magnesium carbonate, magnesium formate, magnesium halides, magnesium oxides and mixtures thereof, and said chromium compound is selected from the group consisting of chromium nitrate, chromium hydroxide, chromium hydrates, chromium oxalate, chromium carbonate, chromium acetate, chromium formate, chromium halides, chromium oxides and mixtures thereof.

2. The process according to claim 1 wherein said hydrocarbons have 3 to 8 carbon atoms.

3. The process according to claim 2 wherein said hydrocarbons have 3 to 6 carbon atoms.

4. The process according to claim 3 wherein the hydrocarbons have non-quaternary contiguous carbon atoms.

5. The process according to claim 1 wherein the catalyst is magnesium oxide and chromium oxide in a ratio of CrO₃ to MgO between 0.5:1 and 3:1.

6. A process for the oxidative dehydrogenation of saturated hydrocarbons having 2 to 20 carbon atoms and at least one

grouping and having a boiling point below about 350° C., said process comprising contacting a reaction mixture with a catalyst at a temperature of at least 250° C. and less than 900° C., said reaction mixture comprising said hydrocarbons in the vapor phase and oxygen in a molar ratio of greater than 0.1 mol of oxygen per mol of said hydrocarbons, said catalyst consisting essentially of (1) a member selected from the group consisting of S, W, a Group IV element and mixtures thereof and (2) a member selected from the group consisting of (i) a magnesium compound and a chromium compound, (ii) magnesium chromate and (iii) magnesium oxide, chromium oxide and magnesium chromate.

7. The process according to claim 6 wherein the catalyst consists of (1) magnesium oxide and chromium oxide in a ratio of CrO₃ to MgO of between 0.5:1 and 3:1 and a member selected from the group consisting of S, W a Group IV element and mixture thereof.

8. The process according to claim 6 wherein the member of Group (I) is an element selected from the group consisting of S, W, Si, Ti, Sn, Ge, Zr, and mixtures thereof.

9. The process according to claim 8 wherein said hydrocarbons comprise hydrocarbons having 3 to 8 carbon atoms.

10. The process according to claim 9 wherein the member group (1) is S.

11. The process according to claim 9 wherein the member of group (1) is Si.

12. The process according to claim 9 wherein the member of group (1) is Ti.

13. The process according to claim 9 wherein the member of group (1) is Ge.

14. The process according to claim 9 wherein the member of group (1) is Zr.

15. The process according to claim 10 wherein the hydrocarbon has 4 carbon atoms.

16. The process according to claim 9 wherein the member of group (1) is a mixture of Si and W.

17. The process according to claim 9 wherein the member of group (1) is a mixture of Ge and W.

18. The process according to claim 16 wherein the hydrocarbon has 4 carbon atoms.

19. The process according to claim 17 wherein the hydrocarbon has 4 carbon atoms.

References Cited

UNITED STATES PATENTS 3,308,196  3/1967  Bajars _____ 260—680

D. E. GANTZ, Primary Examiner

V. O'KEEFE, Assistant Examiner

U.S. Cl. X.R.

252—439, 468; 260—680 E

UNITED STATES PATENT OFFICE
CERTIFICATE OF CORRECTION

Patent No. 3,801,672   Dated April 2, 1974

Inventor(s) Laimonis Bajars

It is certified that error appears in the above-identified patent and that said Letters Patent are hereby corrected as shown below:

Col. 2, line 42 reads "nad" but should read --- and ---.
Col. 2, line 48 reads "acids alkyl" but should read --- acids, alkyl ---.
Col. 4, line 19 reads "catalst" but should read --- catalyst ---.
Col. 5, line 37 reads "Steam/$S_2$*" but should read --- Steam/S* ---.
Col. 6, line 2 reads "28/16" but should read --- 28/56/16 ---.
Col. 6, line 32 reads "(as $H_3SO_4$) gas" but should read --- (as $H_2SO_4$) gave ---.
Col. 6, line 42 reads "550 - 525°C" but should read --- 500 - 525°C ---.
Col. 7, line 66, reads "C/S/Y 5" but should read --- C/S/Y ---.
Col. 7, line 69 reads "dehydrogenaton" but should read --- dehydrogenation ---

Signed and sealed this 4th day of March 1975.

(SEAL)
Attest:

RUTH C. MASON
Attesting Officer

C. MARSHALL DANN
Commissioner of Patents
and Trademarks